United States Patent
Athenes et al.

(10) Patent No.: US 6,192,441 B1
(45) Date of Patent: *Feb. 20, 2001

(54) APPARATUS FOR POSTPONING PROCESSING OF INTERRUPTS BY A MICROPROCESSOR

(75) Inventors: Claude Athenes, Paris; Pascal Moniot, Crolles, both of (FR)

(73) Assignee: SGS-Thomson Microelectronics S.A., Gentilly (FR)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/690,926

(22) Filed: Aug. 1, 1996

(30) Foreign Application Priority Data

Aug. 3, 1995 (FR) .................................. 95 09638

(51) Int. Cl.$^7$ ......................................... G06F 7/00
(52) U.S. Cl. ............................................ 710/262
(58) Field of Search .................... 395/733, 734, 395/735, 868, 859, 824

(56) References Cited

U.S. PATENT DOCUMENTS

| | | | |
|---|---|---|---|
| 3,665,415 | * 5/1972 | Beard et al. | 395/734 |
| 3,789,365 | * 1/1974 | Jen et al. | 395/733 |
| 4,271,468 | * 6/1981 | Christensen et al. | 395/733 |
| 4,523,277 | * 6/1985 | Schnathorst | 395/734 |
| 4,574,350 | * 3/1986 | Starr | 395/726 |
| 4,799,148 | * 1/1989 | Nishioka | 395/733 |
| 4,847,752 | * 7/1989 | Akashi | 395/734 |
| 4,953,072 | * 8/1990 | Williams | 395/733 |
| 4,980,820 | * 12/1990 | Youngblood | 395/868 |
| 5,349,667 | * 9/1994 | Kaneko | 710/267 |
| 5,446,910 | * 8/1995 | Kennedy et al. | 710/119 |
| 5,507,032 | * 4/1996 | Kimura | 395/859 |
| 5,659,759 | * 8/1997 | Yamada | 710/265 |

\* cited by examiner

*Primary Examiner*—David A. Wiley
(74) *Attorney, Agent, or Firm*—Wolf, Greenfield & Sacks, P.C.; James H. Morris; Theodore E. Galanthay

(57) ABSTRACT

This device controls the interrupts of a microprocessor based on events occurring in at least one entity associated with this microprocessor. The device organizes the storage of words representative of at least an origin and a type of the interrupt issued by the entity. The interrupts from the entity are stored in an area of a memory. When there is more than one entity, each entity has an area of memory allocated to it. The microprocessor can access these memory areas and process the interrupts. An indicator is also provided so that the device can tell when a memory area has become full.

36 Claims, 2 Drawing Sheets

APPARATUS FOR POSTPONING PROCESSING OF INTERRUPTS BY A MICROPROCESSOR

BACKGROUND OF THE INVENTION

1. Field of the Invention

The present invention relates to a device for controlling interrupts generated by different entities associated with a microprocessor.

2. Discussion of the Related Art

Conventionally, a microprocessor includes a certain number of inputs for receiving interrupt signals from different entities. These signals have the function of notifying the microprocessor of the occurrence of particular events within the entities.

A conventional interrupt control processes these particular events in real time. In other words, when an event occurs in an entity, the program executed by the microprocessor is stopped at once to process this event by executing a routine associated therewith. Such real time processing is necessary to avoid a situation where an event having occurred in an entity is not taken into account by the microprocessor upon the occurrence of another event in the same entity.

A disadvantage of conventional systems is that real time interrupt control requires the provision of a very fast microprocessor, even if such speed is not needed for the processing of the programs associated with the operation of the system.

Another disadvantage is that it is possible, in a succession of interrupts, that an interrupt of a given type appears even though the processing of a preceding interrupt of the same type (using the same routine) is not finished, because it was interrupted upon occurrence of other events. The processing of this preceding interrupt will not be able to be finished, which can cause an operation error.

SUMMARY OF THE INVENTION

The present invention aims at overcoming these disadvantages by providing an interrupt control device which postpones the processing of the interrupts by the microprocessor.

The invention also aims at providing a device by means of which no event is omitted by the microprocessor.

The invention further aims at modifying the priority rank associated with each entity issuing an interrupt without it being necessary to modify the connections between the different elements of the system.

To achieve these aims, the present invention provides a device for controlling the interrupts of a microprocessor based on events occurring in at least one entity associated with the microprocessor, the device including means for organizing the storage of words representative of at least the origin and type of the interrupts issued by the entity.

According to an embodiment of the present invention, these words are stored in at least one area of a memory dedicated thereto. The organizing means includes a first register containing the address of the first word of the memory area and a logic circuit for calculating the address in the memory area at which this word is to be stored.

According to an embodiment of the present invention, the storage of the words in the memory area is performed circularly. Each word includes a bit indicative of the existence of an interrupt to be processed and set at an active state as the word is stored.

According to an embodiment of the present invention, the bit indicative of the existence of an interrupt to be processed in the word which contains it is set at an inactive state by the microprocessor when reading this word. The bit indicates the existence of an interrupt to be processed further and is used to determine the saturation of the memory area.

According to an embodiment of the present invention, the device includes at least one FIFO register which receives the words of said entity and provides them to the address calculation logic circuit.

According to an embodiment of the present invention, the device is for controlling interrupts issued by several entities, each entity being associated with a memory area and the device includes a second register containing, for each area, a code indicative of its size.

According to an embodiment of the present invention, the device is associated with an interrupt register connected to be read by the microprocessor The interrupt register has a number of bits at least equal to the number of memory areas. Each bit indicates, by its state, respectively, active or inactive, the presence or the absence of an interrupt stored in the area associated therewith. The setting of a bit at its active state is performed by the address calculation circuit and the setting of all bits to the inactive state is performed by the microprocessor, at each reading.

According to an embodiment of the present invention, the interrupt register is associated with a mask register of same size, the bits of which are set by the microprocessor. In addition, a circuit for generating a signal sent to the microprocessor, where this signal indicates the presence of an unmasked interrupt, is also included.

According to an embodiment of the present invention, the interrupt register further contains at least bits indicative of interrupts generated by the address calculation logic circuit, at least one of these bits indicating the saturation of one memory area.

According to an embodiment of the present invention, the microprocessor determines the processing priority of the interrupts contained in one memory area with respect to those contained in another memory area.

These objects, features and advantages as well as others, of the present invention, will be discussed in detail in the following non-limiting description of specific embodiments in relation to the accompanying drawings.

DETAILED DESCRIPTION

Figure 1:
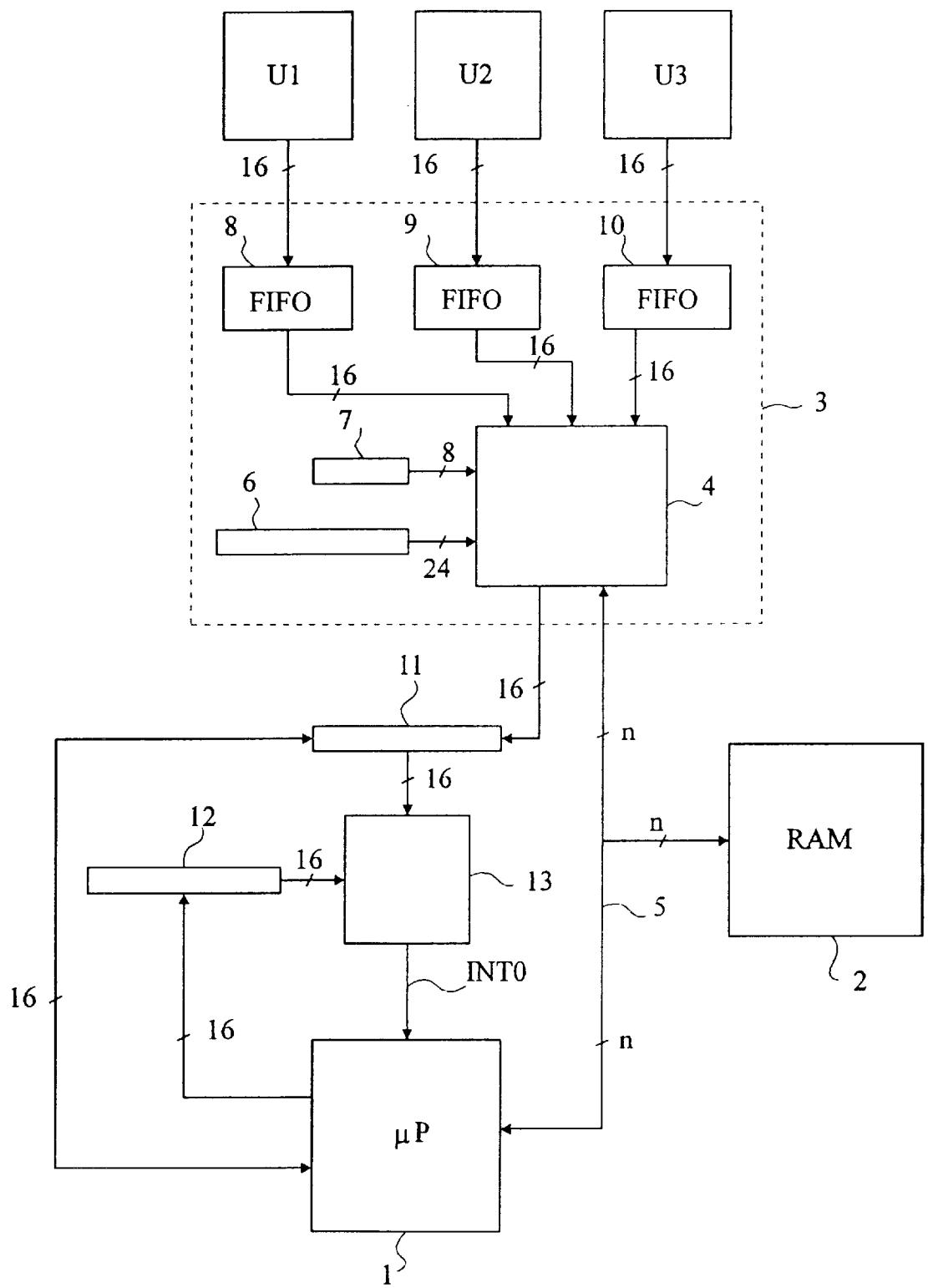
FIG. 1 shows, in the form of a block diagram, an embodiment of an interrupt control device according to the present invention.

For clarity, only the elements and connections which are necessary to the understanding of the present invention have been shown in FIG. 1.

A feature of the present invention is to organize a storage of the events which occur in different entities U1, U2, U3 associated with a microprocessor 1 and to enable microprocessor 1 to read out these events from a memory 2, herein a RAM, when the microprocessor is available to process one or several interrupts. Thus, an event which appears in a given entity U will not interrupt the processing of the preceding event, whether the latter occurred in this entity or not. The risk that a subsequent event interrupts the processing of a preceding interrupt of the same type, issued by a same entity is therefore canceled, thus avoiding the risks of operation errors.

An interrupt control device 3 according to the present invention includes a logic circuit 4 for calculating addresses and generating a word for at least defining the event which caused the issue of an interrupt by an entity. In FIG. 1, three entities, respectively U1, U2 and U3 have been shown.

Preferably, RAM 2 corresponds to the RAM associated with the system in which the device according to the present invention is incorporated. This memory 2 thus is common to microprocessor 1 and to the different elements of the system. The memory 2 is connected to the logic circuit 4 of device 3 as well as to microprocessor 1 by means of a bus 5. The number n of bits of this bus 5 depends on the size of memory 2. Bus 5 is, in practice, constituted by an address bus, a data bus and a connection indicating whether the task to be performed in memory 2 is a reading or a writing operation.

Upon occurrence of an event justifying an interrupt, an entity U1, U2 or U3 issues to interrupt control device 3 a word, for example of sixteen bits, at least defining the origin of and reason for the interrupt.

The function of device 3 according to the present invention then is to organize the storage of this word within RAM 2.

For this purpose, the circuit 4 of device 3 determines the address of memory 2 whereat the word is to be stored. It thus behaves as a Direct Memory Access (DMA) controller.

According to the present invention, an area A of RAM 2 is assigned to the storage of the interrupts. Circuit 4 is associated with a first register 6 containing the address of the first word W of this area A. The size of register 6 is a function of the size of memory 2, for example, twenty-four bits for a memory 2 of sixteen megawords of sixteen bits.

Figure 2:
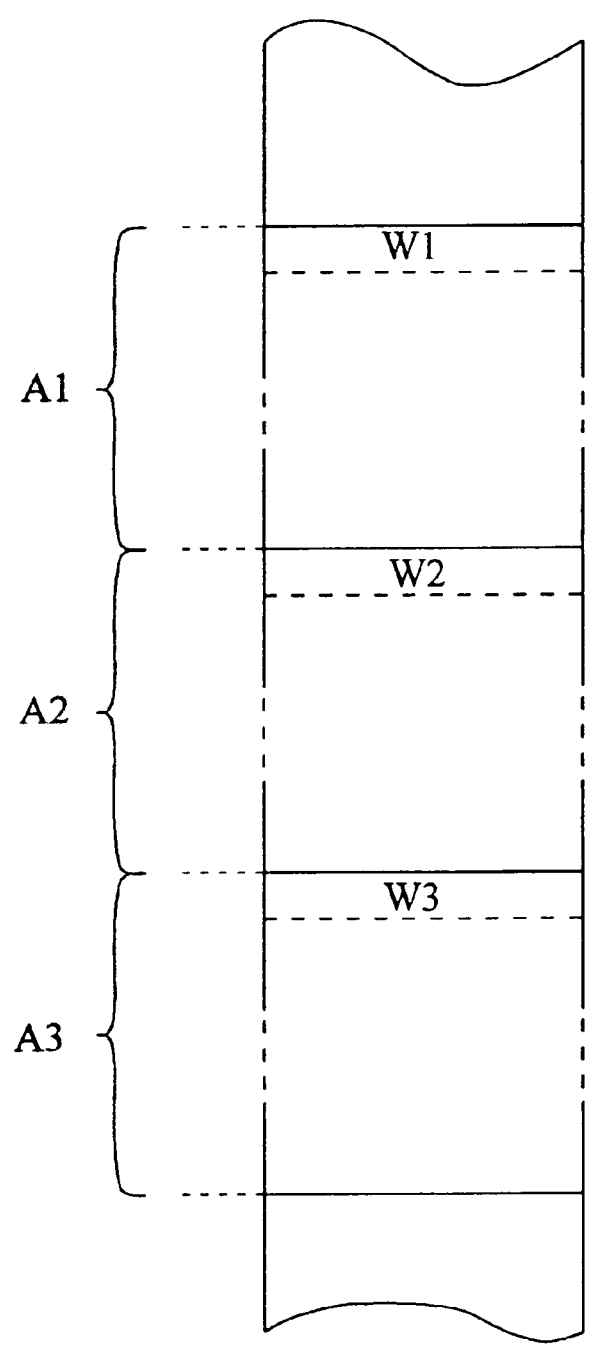
FIG. 2 shows an embodiment of a partition of a memory associated with a device such as shown in FIG. 1.

Preferably, and as illustrated by FIG. 2, several successive areas A are assigned for the storage of the interrupts, each area being associated with an entity U. This simplifies, as will be seen later, the processing of the interrupts according to a priority rank which is associated with each entity U. Should the case arise, for example if two (or several) entities U have a linked operation, a same area A is assigned to these entities U while the other entities are assigned independent areas. According to the present invention, it is assumed that an entity U can be constituted by a physical entity (for example a given peripheral device) or by a functional entity of a physical entity including several functional entities.

In the example shown in FIGS. 1 and 2, it is assumed that each entity, respectively U1, U2 and U3, is assigned to an area, respectively A1, A2 and A3 (FIG. 2) of memory 2.

An advantage of using several areas A is that it avoids having to encode, in the word stored within memory 2, the entity U which has issued the interrupt. When a same area A is shared between several entities U, the number of these entities is preferably small (for example two) to enable the encoding of the entity issuing the interrupt with a smaller number of bits (for example, one bit).

The storage of the successive interrupts transmitted by a given entity U in the area A assigned thereto is performed circularly. In other words, the first word W of area A is filled upon an occurrence of a first interrupt, the second word upon the occurrence of the second interrupt and so on. When the end of area A is reached, device 3 stores the following interrupt, again, in the first word W of this area A.

The limit of operation without loss of events by device 3 according to the present invention is thus related to the size of memory area A. Indeed, when microprocessor 1 has not processed interrupts in an area A for a relatively long period of time and a new event occurs while area A is full, that is, its first word W has not yet been read by microprocessor 1, an event will be lost. The size of an area A of memory 2 is thus established, according to the present invention, depending on the expected frequency of interrupts issued by the entity (or the entities) U with which this area is associated and the processing speed of microprocessor 1. As will be seen below, the present invention avoids any loss of events even when area A becomes full.

To determine whether the memory location at which device 3 intends to store a new word in a given area A is free, each word includes a bit NS which indicates the presence, at this address, of a word corresponding to an interrupt. This bit NS is added by device 3, the state of the other bits of the word being directly generated by the entity U which issued the interrupt. In other words, device 3 adds a bit to the word it receives from an entity U. When it writes a word into memory 2, device 3 positions this bit in an active state, for example "1", which indicates that the corresponding address contains an interrupt to be processed. Bit NS is, for example, the most significant bit. This bit NS is disabled, for example positioned in state "0", by microprocessor 1 when reading the corresponding word for processing the interrupt. Circuit 4 also adds, should the case arise, a bit indicative of the entity U which has issued the interrupt when a same memory area A is shared between several entities U.

An advantage of the circular organization of the writing into each of areas A and of the use of bit NS is that it enables device 3 to determine, by examining the contents of bit NS at the address of a new word that it intends to write, whether the area A considered is full or not. Thus, and as will be seen later, the interrupt control device according to the present invention can be, not only parametered, but can also be automatically adapted in operation to avoid any loss of events.

The contents of a word depend on the entity U having issued the interrupt. Indeed, a word should contain all the indications to enable microprocessor 1 to process the interrupt when it reads this word. Should the case arise, a word can include, for certain entities U, not only the origin and type of the event, but also the data which caused the event itself.

In the example shown in FIG. 2, where several areas A of RAM 2 are assigned to interrupt control device 3, these areas A1, A2 and A3 are, preferably, consecutive. This enables device 3, which contains the address of the first word W1 of a first area A1 in register 6, to easily determine the address of the first words, respectively W2 and W3, of the other areas A2 and A3 from the size of each area contained within a second register 7 associated therewith.

When device 3 has to store an interrupt in an area other than the first area A1, logic circuit 4 calculates, from the size of the areas information contained within register 7, the address of the first word W2 or W3 of this other area, respectively, A2 or A3. The size of an area is, preferably, encoded as a multiple of memory groups in order to limit the size of register 7. Thus, by using, for example, a register 7 of eight bits and by assigning three bits to area A1, three bits to area A2 and two bits to area A3, areas A1 and A2 can be sized to up to eight times m words, that is, eight groups of m words, and area A3 can be sized to up to four times m words. The number m corresponds to a power of two. Thus, m indicates the weight of the address bit from which the code contained within register 7 is to be added to the address of word W1.

An advantage of using register 7 is that a same device 3 according to the present invention can be parametered according to the system associated therewith and of which it must control the interrupts.

Of course, the size of register 7 depends on the maximum number of memory areas for which device 3 is constructed. In some cases, the size of a group of words can be different for each area A. Circuit 4 then includes means for performing a different calculation according to the memory area A to which the code of register 7 relates. Since circuit 4 identifies, according to the bit location in register 7, the memory area A which corresponds to the code that it processes, these means can be simply implemented by assigning, to each code, a different weight in the addition with the address of word W1.

As a specific example of implementation, by encoding the size by groups of one hundred and twenty-eight words for areas A1 and A2 and by groups of sixty-four words for area A3, an eight-bit register 7 can size areas A1 and A2 from zero to one thousand and twenty-four words and area A3 from zero to two-hundred and fifty-six words by steps of sixty-four.

The identifying, by device 3, of the entity U which issues an interrupt is realized by the physical address of this interrupt, that is, by the terminals of device 3 on which the interrupt arrives.

Thus, circuit 4 can determine, upon arrival of an interrupt, the area A wherein the interrupt is to be stored and, if several entities U share a same area A, the identification code to be added to the stored word.

Preferably and as is shown in FIG. 1, circuit 4 receives the interrupts transmitted by entities U1, U2 and U3 via FIFO registers 8, 9 and 10. This ensures that all interrupts are stored. Indeed, bus 5 can be busy at the occurrence of an interrupt and device 3 must, in this case, wait before being able to store this interrupt.

The number of rows in each of FIFO registers 8, 9 and depends on the expected traffic on bus 5 and on the expected frequency of the interrupts from entities U1, U2 and U3. This number of rows also depends on the priority rank of access to bus 5 which is associated with device 3. Indeed, although not shown, other elements of the system have access to memory 2, for example some other entities U. The system is generally associated with a device for controlling the priorities of access to bus 5 between these different elements. The higher the priority rank held by device 3, the lower can be the number of rows of registers 8, 9 and 10 for a same frequency of occurrence of the interrupts.

The reading of the interrupts by microprocessor 1 is achieved by respecting, at least for one area A, the order in which the interrupts have been stored.

For this purpose, microprocessor 1 stores, for example, in a register or in memory 2, the address of the last interrupt the microprocessor 1 processed in each area A. Thus, when microprocessor 1 processes the interrupts of a given area A, it can directly read the first unprocessed interrupt and stop as soon as it reaches a word having its bit NS at state "0", in which case all the interrupts of this area A have been processed.

According to a first embodiment, not shown, the processing of the interrupts by microprocessor 1 is performed by polling the corresponding areas of memory 2. Microprocessor 1 thus controls, alone, the times when it wants to process interrupts. Microprocessor 1 then reads, for example, sequentially, each area A of memory 2 starting from the address following that of the last processed interrupt of this area A. It passes to the following area A as soon as it reaches a word having its bit NS at state "0" and stores the address of the last processed interrupt, i.e., the address which corresponds to the address preceding that of the word having its bit NS at state "0". Such an embodiment is, for example, used when device 3 is designed for a system in which a single entity U generates interrupts. Such an embodiment can also be used, for example, when the interrupts do not need to be processed according to a priority rank between different entities U. Preferably, in this case, all interrupts are stored in a same area A of memory 2.

According to a second embodiment such as shown in FIG. 1, microprocessor 1 enters its interrupt processing program under control of a signal INTO which indicates to the microprocessor the presence of at least one interrupt.

The operation of such an embodiment is based on the conventional use of an interrupt register 11, of a mask register 12 and of a circuit 13 for generating signal INTO. Mask register 12 has the same size as interrupt register 11.

According to the present invention, the bits of register 11 are set by device 3. Register 11 includes at least one bit per area A of memory 2. This bit is set at an active state, for example "1", when an interrupt has been stored in this area A. Thus, the reading of register 11 enables microprocessor 1 to identify those of areas A which contain interrupts to be processed without it being necessary to explore the areas A which are empty.

Register 11 also contains, preferably, bits indicative of specific events which are linked with the operation of the system and of which a storage in memory 2 is not required. These are, for example and among others, three bits which indicate whether each area A1, A2 and A3 of memory 2 is full or not. They can also be bits indicative of the presence of events on other elements of the system but which do not need to be stored, for example, on an element which, as it generates an interrupt, waits for this interrupt to be processed to resume its operation and to be able to generate a new one. In this case, although it has not been shown, device 3 receives signals from these elements which enable it to position these bits.

An advantage of the present invention is that all the events occurring in the system remain available for microprocessor 1. When microprocessor 1 examines the contents of register 11, it can deduce all that happened in the system since its preceding examination of register 11.

Even if one of the areas A of memory 2 becomes full, microprocessor 1 is informed thereof without it being necessarily required to interrupt it at once, the information being contained within register 11. Thus, microprocessor 1 is able, according to the routine associated with an interrupt of this type, to deal with such an event even if not in real time. Of course, it will generally be preferred that microprocessor 1 be informed at once that one of areas A is saturated in order to be able to react immediately so as to avoid a blocking of the system.

The writing by device 3 into a given memory area A is circular and microprocessor 1 reads the words contained in this area in their storage order. Device 3 determines, by examining bit NS at the address where it intends to write a new word, whether the area A is considered full or not. Indeed, if this bit NS is at state "1", this means that the whole memory area A is full. Device 3 then generates an interrupt, preferably of a highest priority, to microprocessor 1.

The bits of mask register 12 are set by microprocessor 1. Circuit 13 corresponds, for example and conventionally, to an AND combination between two equally significant bits from registers 11 and 12. The results of the different AND combinations are combined by a logic OR, the result of which corresponds to signal INTO.

Signal INTO thus switches when a bit of register 11 which is unmasked by an equally significant bit of register 12 switches to state "1" or when a bit of register 11 which is in state "1" ceases to be masked by the equally significant bit of register 12. Microprocessor 1 then examines the contents of register 11 and processes the interrupt(s).

The bits of register 11 are reset to state "0" by microprocessor 1 as it reads them.

An advantage of the present invention is that microprocessor 1 can, in the presence of interrupts generated by several entities U, process these interrupts according to a priority rank determined by its interrupt processing program. The priority rank, according to the present invention, can be modified without it being necessary to modify the connections of the different elements of the system.

Another advantage of the present invention is that microprocessor 1 can henceforth use mask register 12 to forbid the processing of a given interrupt while another interrupt is under process. It is enough, for this purpose, that the microprocessor masks, by means of register 12, all the bits of register 11 as soon as it has examined them. Such an operation is not possible in conventional systems. Indeed, in conventional systems, by masking bits corresponding to entities which are likely to issue interrupts even though one of their preceding interrupts has not been processed, the following interrupts would be lost.

When necessary, it could be devised that certain bits, except for the bits corresponding to the areas of memory 2, are never masked to cause, in some cases, an immediate interrupt of microprocessor 1. For example, it could be devised that the bits which correspond to the interrupts generated by device 3 to indicate a saturation of the areas A of memory 2 are never masked. Thus, as soon as an area A becomes full, microprocessor 1 can be led to process the interrupts of this area A, and the highest priority can be given to it by the program when one of these bits is at state "1". It could then be devised to choose the number of rows of FIFOs 8, 9 and 10 for avoiding, in such a case, the loss of the events.

An advantage of the present invention is that it can also be devised that the microprocessor automatically increases the size of the memory area considered to avoid any loss of information. The choice between an increase in the size of the memory area and an immediate and prioritary processing of the interrupts contained in the area upon the occurrence of an interrupt indicative of a saturation of this area is, according to the present invention, left to the user's choice according to the application for which the device according to the present invention is intended.

Of course, the present invention is likely to have various alternatives, modifications, and improvements which will readily occur to those skilled in the art. In particular, each of the elements described can be replaced by one or several elements performing the same function. Further, the practical implementation of the logic circuits to which the preceding description referred is within the abilities of those skilled in the art according to the system for which the device is meant and the functional indications given as an example. Moreover, the sizes of the registers given as an example can be modified according to the system for which the device according to the invention is meant, particularly, in regard to the number of entities for which the interrupts should be stored.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalents thereto.

What is claimed is:

1. A device for controlling interrupts of a microprocessor based on events occurring in at least one entity associated with the microprocessor, the device including organizing means for organizing and storing at least two words representative of at least an origin and a type of at least two interrupts issued by the at least one entity wherein the storing of the at least two words does not cause an interrupt signal to initiate interrupt processing by the microprocessor of interrupts stored in the organizing means.

2. The interrupt control device according to claim 1, wherein the at least two words are stored in at least one respective memory area of a memory, said organizing means including a first register containing a first area address of a first word of the at least one respective memory area and an address calculation logic circuit to calculate at least two addresses at which the at least two words are to be respectively stored in the at least one respective memory area of the memory.

3. The interrupt control device according to claim 2, wherein the storage of the at least two words in the at least one area of the memory is performed circularly, and each word of the at least two words includes an interrupt existence bit, NS, indicative of an existence of an interrupt to be processed, set to an active state when each word of the at least two words is stored.

4. The interrupt control device according to claim 3, wherein the interrupt existence bit, NS, is set to an inactive state by the microprocessor when reading the each respective word of the at least two words, the interrupt existence bit, NS, further being used to determine a saturation of the at least one memory area of the memory.

5. The interrupt control device according to claim 2, including at least one FIFO to receive the at least two words of said at least one entity and to provide the at least two words to the address calculation logic circuit.

6. The interrupt control device according to claim 2, including a plurality of entities, each entity of the plurality of entities associated with a respective memory area of the memory, the device further including a second register containing, for each respective memory area, a code indicative of a size of each respective memory area.

7. The interrupt control device according to claim 6, associated with an interrupt register connected to the microprocessor, the interrupt register having a number of bits at least equal to a number of memory areas of the memory, each bit of the interrupt register settable to a first state and a second state, respectively representing a presence or an absence of an interrupt stored in the memory area associated therewith, the setting of each bit of the interrupt register to the first state being performed by the address calculation circuit and the setting of each bit of the interrupt register to the second state being performed by the microprocessor at each reading of the input register.

8. The interrupt control circuit according to claim 7, wherein the interrupt register is associated with a mask register of a same size, wherein bits of the mask register are set by the microprocessor, and wherein the control circuit further comprises a circuit, coupled to the interrupt and mask registers, to generate a signal sent to the microprocessor, the signal indicating a presence of an unmasked interrupt.

9. The interrupt control device according to claim 7, wherein the interrupt register further comprises at least one bit indicative of an interrupt generated by the address calculation logic circuit, at least one of the at least one bits of the interrupt register indicating a saturation of a memory area of the memory.

10. The interrupt control device according to claim 6, wherein the microprocessor determines a processing priority of the interrupts contained in a first memory area of the memory with respect to those contained in a second memory area of the memory.

11. The device as recited in claim 1, wherein the means for organizing storage operates independently of the microprocessor.

12. An interrupt control device for controlling an interrupt generated by an entity, said interrupt to be processed by a second device, the control device comprising:
    an interrupt register to receive an interrupt word representing an interrupt request from a respective entity;
    a memory size register including information regarding a size of a memory area associated with the respective entity;
    an address register including information regarding a first address of the respective memory area associated with the respective entity; and
    a logic circuit operatively coupled to the interrupt register, the memory size register and the address register to store the interrupt word received from the interrupt register at the first address in the memory area associated with the respective entity;
    wherein the storing of the interrupt word in the memory area does not cause an interrupt signal to initiate interrupt processing by the second device of interrupt words stored in the interrupt register.

13. The device as recited in claim 12, wherein the interrupt register is a FIFO.

14. The device as recited in claim 12, wherein the logic circuit comprises:
    a next address calculating circuit to calculate a next address at which a subsequent interrupt word received from the respective entity will be stored in the memory area.

15. The device as recited in claim 12, wherein the logic circuit comprises:
    a bit-appending circuit to append a single bit, NS, to the interrupt word, the single bit, NS, set to a first state to indicate that the interrupt word has not been processed.

16. The device as recited in claim 15, wherein the logic circuit further comprises:
    a bit-checking circuit to check the single bit, NS, in the interrupt word stored at the first address in the memory area associated with the respective entity.

17. The device as recited in claim 12, wherein the second device is a microprocessor.

18. An interrupt control device for controlling storage of an interrupt word representing an interrupt request generated by a respective entity and directed to a second device, the control device comprising:
    an input register to receive the interrupt word; and
    a logic circuit, operatively coupled to the input register, to calculate a memory address and to store the interrupt word in a memory at the calculated memory address,
    wherein the storing of the interrupt word in the memory does not cause an interrupt signal to initiate interrupt processing by the second device of interrupt words stored in the memory.

19. The device as recited in claim 18, further comprising:
    a memory size register, coupled to the logic circuit, to store information regarding a size of a memory area associated with the respective entity.

20. The device as recited in claim 18, further comprising:
    an address register, coupled to the logic circuit, to store information regarding a first memory address location at which to store the interrupt word of the respective entity.

21. The device as recited in claim 18, wherein the logic circuit comprises:
    a next memory address calculating circuit to calculate a next memory address at which a subsequent interrupt word received from the respective entity will be stored in the memory.

22. The device as recited in claim 18, wherein the logic circuit comprises:
    a bit-appending circuit to append a single bit, NS, to the interrupt word, the single bit, NS, set to a first state to indicate that the interrupt word has not been processed.

23. The device as recited in claim 18, wherein the second device is a microprocessor.

24. A system comprising:
    a microprocessor;
    an interrupt receiver register to receive an interrupt word representing an interrupt request generated by an entity and directed to a microprocessor;
    a memory operatively coupled to the microprocessor; and
    a logic circuit, operatively coupled to the interrupt receiver register and the memory, the logic circuit to calculate a memory address and to store the interrupt word at the calculated memory address in the memory;
    wherein the microprocessor is programmed to retrieve the interrupt word stored at the calculated memory address and also programmed to process the retrieved interrupt word, and
    wherein the microprocessor does not initiate its retrieving and processing of the interrupt word in response to the logic circuit causing an interrupt signal after storing interrupt words in the memory.

25. The system as recited in claim 24, further comprising:
    an interrupt register coupled to the logic circuit;
    a mask register; and
    a comparison circuit to compare contents of the interrupt register and contents of the mask register and to generate a result of the comparison as a signal to the microprocessor to cause the microprocessor to service the interrupt word in the memory.

26. A method for controlling interrupts generated by a first entity associated with a microprocessor, the method comprising steps of:
    partitioning a memory to include a first memory area for the first entity;
    receiving a first interrupt word from the first entity, the first interrupt word representing a first interrupt request generated by the first entity and to be processed by the microprocessor;
    storing the first interrupt word in the first partitioned memory area at a first memory address without causing an interrupt signal to be sent to the microprocessor;
    the microprocessor retrieving the stored first interrupt word from the first partitioned memory area; and
    the microprocessor processing the first entity associated with the retrieved first interrupt word, wherein the microprocessor does not initiate its retrieving and processing of the first interrupt word in response to interrupt words being stored in the first partitioned memory.

27. The method as recited in claim 26, wherein the storing step includes the steps of:

appending an indicator bit to the first interrupt word; and setting the indicator bit to a first state.

28. The method as recited in claim 27, wherein the retrieving step comprises a step of:

setting the indicator bit to a second state.

29. The method as recited in claim 27, wherein the retrieving step comprises a step of:

retrieving each interrupt word in the first partitioned memory area having an indicator bit set to the first state.

30. The method as recited in claim 26, wherein the storing step includes the steps of:

retrieving an initial memory address value for the first partitioned memory area; and calculating the first memory address from the initial memory address value.

31. The method as recited in claim 26, wherein the storing step comprises a step of:

setting a first bit in a register to a first state to indicate that the first interrupt word has been stored in the first partitioned memory area.

32. The method as recited in claim 31, wherein the retrieving step comprises a step of:

checking the first bit in the register;

when the first bit is in the first state, retrieving each interrupt word in the first partitioned memory area having an indicator bit set to the first state; and when all of the interrupt words in the first partitioned memory area have been retrieved, setting the first bit in the register to a second state to indicate that the interrupt words have been retrieved from the first partitioned memory area.

33. The method as recited in claim 26, wherein the retrieving step comprises a step of:

comparing the first bit to a mask bit.

34. The method as recited in claim 26, further comprising steps of:

receiving a second interrupt word from the first entity;

storing the second interrupt word in the first partitioned memory at a second memory address; and retrieving the stored second interrupt word from the first partitioned memory area.

35. A system for storing interrupts generated by an entity, the system comprising:

an interrupt register to receive first and second interrupt words representing, respectively, first and second interrupt requests from the entity;

a memory size register including information regarding a size of a memory area associated with the entity;

an address register including information regarding a first address and a second address in the memory area associated with the entity;

a logic circuit operatively coupled to the interrupt register, the memory size register and the address register to store the first and second interrupt words received from the interrupt register at, respectively, the first and second addresses in the memory area associated with the entity;

a microprocessor; and a memory operatively coupled to the microprocessor and the logic circuit, the memory including the memory area associated with the entity, wherein the storing of the first and second interrupt words does not cause an interrupt signal to initiate interrupt processing by the microprocessor of the interrupt words stored in the memory.

36. The system as recited in claim 35, wherein the logic circuit comprises:

a next address calculating circuit to calculate a next address at which a subsequent interrupt word received from the entity will be stored in the memory area.

* * * * *

UNITED STATES PATENT AND TRADEMARK OFFICE
CERTIFICATE OF CORRECTION

PATENT NO. : 6,192,441 B1
DATED : February 20, 2001
INVENTOR(S) : Claude Athenes and Pascal Moniot It is certified that error appears in the above-identified patent and that said Letters Patent is hereby corrected as shown below:

On the Title Page, item (56) should include:

5,319,753     06/07/94     MacKenna et al.........395/275

French Search Report from French patent application No. 95 09638, filed August 3, 1995

Signed and Sealed this

Seventh Day of August, 2001

*Attest:*

NICHOLAS P. GODICI
*Attesting Officer*     *Acting Director of the United States Patent and Trademark Office*